United States Patent [19]

Hudis

[11] Patent Number: 5,381,301
[45] Date of Patent: Jan. 10, 1995

[54] LEAK-TIGHT AND RUPTURE PROOF, ULTRASONICALLY-WELDED, POLYMER-ENCASED ELECTRICAL CAPACITOR WITH PRESSURE SENSITIVE CIRCUIT INTERRUPTER

[75] Inventor: Martin Hudis, Mattapolsett, Mass.

[73] Assignee: Aerovox Incorporated, New Bedford, Mass.

[21] Appl. No.: 60,421

[22] Filed: May 11, 1993

[51] Int. Cl.⁶ .............................................. H01G 1/11
[52] U.S. Cl. .............................. 361/275.2; 361/306.1; 361/518; 361/520; 29/25.42; 174/52.3
[58] Field of Search ............. 361/15, 16, 17, 272–274, 361/306.1, 517, 518, 519, 520, 274.1, 275.2, 327; 29/25.42; 174/52.2, 52.3; 156/73.1

[56] References Cited

U.S. PATENT DOCUMENTS

| | | | |
|---|---|---|---|
| 3,221,225 | 11/1965 | Sternbeck | 317/256 |
| 3,248,617 | 4/1966 | Hynes et al. | 317/242 |
| 3,553,542 | 1/1971 | Netherwood | 317/247 |
| 3,648,337 | 3/1972 | Greskamp et al. | 29/25.42 |
| 3,680,203 | 8/1972 | Braiman et al. | 29/570 |
| 3,819,437 | 6/1974 | Paine | 156/73.4 |
| 3,866,095 | 2/1975 | Marmorek | 361/520 |
| 4,059,848 | 11/1977 | Koel et al. | 361/272 |
| 4,106,068 | 8/1978 | Flanagan | 361/15 |
| 4,107,758 | 8/1978 | Shirn et al. | 361/275 |
| 4,186,417 | 1/1980 | Grahame | 361/15 |
| 4,209,815 | 6/1980 | Rollins et al. | 361/15 |
| 4,240,126 | 12/1980 | Sanvito | 361/274 |
| 4,283,750 | 8/1981 | Deschanels et al. | 361/274 |
| 4,286,302 | 8/1981 | Owens et al. | 361/15 |
| 4,298,906 | 11/1981 | Elias | 361/433 |
| 4,308,569 | 12/1981 | Rheindorf | 361/275 |
| 4,339,786 | 7/1982 | Evans et al. | 361/433 |
| 4,342,070 | 7/1982 | Evans | 361/433 |
| 4,486,809 | 12/1984 | Deak et al. | 361/272 |
| 4,586,107 | 4/1986 | Price | 361/272 |
| 4,618,516 | 10/1986 | Sager | 428/35 |
| 4,639,828 | 1/1987 | Strange et al. | 361/272 |
| 4,661,876 | 4/1987 | Strange et al. | 361/15 |
| 4,754,361 | 6/1988 | Venturini | 361/15 |
| 4,757,414 | 7/1988 | Barker et al. | 361/15 |
| 4,769,745 | 9/1988 | Viernickel et al. | 361/433 |
| 4,812,941 | 3/1989 | Rice et al. | 361/15 |
| 4,882,115 | 11/1989 | Schmickl | 361/538 |
| 4,897,760 | 1/1990 | Bourbeau | 361/272 |
| 5,019,934 | 5/1991 | Bentley et al. | 361/15 |
| 5,148,347 | 9/1992 | Cox et al. | 361/272 |

FOREIGN PATENT DOCUMENTS

| | | |
|---|---|---|
| 0093455 | 11/1983 | European Pat. Off. |
| 2580114 | 10/1986 | France |
| 55-8045 | 1/1980 | Japan |
| 6134916 | 2/1980 | Japan |
| 55-65844 | 5/1980 | Japan |

OTHER PUBLICATIONS

Kenney, "Designing Plastic Parts for Ultrasonic Assembly", *Machine Design*, May 21, 1992, pp. 65–68.

*Primary Examiner*—Philip H. Leung
*Assistant Examiner*—Gregory L. Mills
*Attorney, Agent, or Firm*—Fish & Richardson

[57] ABSTRACT

A polymer-encased capacitor with a pressure sensitive interruption (PSI) system includes a polymer cover attached to a polymer case, the polymer cover having a skirt-less outer portion ultrasonically sealed to an open end portion of the polymer case. The polymer cover does not include flanged or lipped members extending from the outer edge of the cover (i e., "skirt-less") so that application of ultrasonic energy to the cover does not excite modes of vibration in which vibration nodes occur at intervals around the periphery of the cover, thereby providing a more leak-tight and rupture-proof bond between the capacitor case and cover.

18 Claims, 4 Drawing Sheets

LEAK-TIGHT AND RUPTURE PROOF, ULTRASONICALLY-WELDED, POLYMER-ENCASED ELECTRICAL CAPACITOR WITH PRESSURE SENSITIVE CIRCUIT INTERRUPTER

BACKGROUND OF THE INVENTION

This invention relates to ultrasonically sealing polymer encased electric capacitors.

Self-healing metalized film capacitors typically function by using electrical energy to burn away small capacitor faults in their metal deposited plastic film cores. This burning process tends to clear the fault, but over time the insulating material breaks down and produces gases that gradually increase the internal pressure of the sealed capacitor case. If not alleviated, the increased pressure could eventually cause the case to rupture and leak liquid insulating material. More serious capacitor faults may cause rapid breakdown of the insulating material, in turn, causing rapid build-up of internal pressure leading to a catastrophic failure of the capacitor case. Pressure sensitive interrupters (PSI) are typically incorporated in the capacitor case to prevent rupture by rapidly breaking the internal electrical connection to the capacitor element when internal pressure exceeds a predetermined limit. Thereby, further internal pressure build-up is checked by disabling the source of the pressure.

Some pressure sensitive interrupters employ a nicked wire inside the capacitor case which is caused to stretch and break by an overpressure condition. One end of the nicked wire typically terminates in a solder connection to an electrical terminal which protrudes through the top of the capacitor case and is used to electrically connect the capacitor to an electrical circuit. The other end of the nicked wire is held in place inside the capacitor, usually by the capacitor core. A pressure sensitive mechanism responds to overpressure by causing the electrical terminal to move, against a metered force, away from the stationary capacitor core, thereby stretching and breaking the wire. The precise length of the nicked wire needs to be controlled to assure that the expected displacement of the electrical terminal caused by overpressure provides sufficient breaking tension on the nicked wire, while preventing nuisance breakage due to small displacements caused by external mechanical pulling on the terminal. One example of a nicked wire interrupter system is described in U.S. Pat. No. 5,148,347 which is incorporated herein by reference.

In order for a pressure sensitive interrupter to be effective, the capacitor case in which the interrupter is incorporated must be pressure tight. In applications where the capacitor case is fabricated from a polymer material (e.g., nylon or polypropylene), a polymer cover can be ultrasonically welded to the case to provide a pressure tight polymer encased capacitor. The polymer cover is placed over the polymer case, a compressive force applied between the workpieces and ultrasonic energy applied to the workpieces with an ultrasonic resonator. The dissipation of ultrasonic energy causes the polymer material to melt at contact points so that upon removal of the ultrasonic energy, the melted material solidifies forming a fused joint.

One known approach for providing such a pressure tight seal is to form a groove along the outer rim portion of the cover, into which is received the walls of the open end of the capacitor case. Ultrasonic energy is applied to vibrate the cover so that the vertical walls of the groove and adjacent capacitor case are heated and fuse to provide a "double shear" weld joint. The groove is formed by an inner and another wall around the periphery of the cover. The outer wall forms a skirt that serves to screen the ultrasonically welded area from view, thereby improving the appearance of the finished part. This welding approach, which is shown in U.S. Pat. No. 5,148,347, requires, however, that the dimension of the capacitor case walls and cover groove be held to very close tolerances to assure a leak-tight seal and, even then, the capacitor may not be leak tight at the predetermined pressure limit of the PSI.

Another approach for ultrasonically welding a cover to the capacitor case, one that the present assignee unsuccessfully tried as a solution to problems associated with the double shear approach, was to provide projections or ridges, known as "energy directors" on one or both of the contacting surfaces of the case and cover to be joined. The energy directors generally had a geometry providing a more precisely defined contact surface, so that during welding, the directors softened incrementally from their fronts to their bases, causing the softened and molten polymer material to flow and spread within the space between the case and cover. The use of energy directors also provides a larger tolerance limit for the radial dimensions of the case and the cover (e.g., outer diameter of the case lip and inner diameter of the cover lip). The same arrangement of an outer skirt on the cover extending over the weld area was employed.

This construction, while it reduced the criticality of the dimensional tolerances for the cover and case and provided some improvement in the reliability of the PSI's operation, introduced its own problem. During ultrasonic welding, certain modes of vibration of the cover occurred in which vibration nodes (areas of little or no vibratory movement) occurred at intervals around the periphery of the cover, tending to weaken the welding in those areas. To compensate for this, it was sometimes necessary to increase the intensity of the ultrasonic vibration to such an extent that the surface of the cover would become marred at locations of maximum vibration. The result was either a deformed part, or one that was not reliably both rupture-proof and leak-tight.

SUMMARY OF THE INVENTION

We have discovered that a much improved ultrasonic weld can be achieved in a leak-tight and rupture-proof capacitor with a polymer cover and polymer case, at pressures insuring reliable operation of a pressure sensitive interrupter incorporated within the case, by configuring the polymer cover so that it is "skirt-less", i.e., it does not have a weld-covering skirt at its periphery as had been the case in prior art efforts. Surprisingly, this change completely solves the problem of undesirable modes of vibration in which vibration nodes tended to appear at intervals around the periphery, with resulting unevenness in welding.

In preferred embodiments, a upwardly projecting outer flange is provided around the perimeter of the polymer case.

The outer flange is attached to an outer edge of the open end of the case for aligning the outer portion of the cover prior to ultrasonic sealing and for containing and concealing the flash (the liquified plastic produced during the welding process which hardens upon cooling).

The end surface of the case includes a projecting energy directing element in contact with the outer portion of the cover. Alternatively, the end surface of the case and the outer portion of the cover each have energy directing elements in face-to-face contact with each other with substantially triangular cross sections, the apexes of the cross sections in contact with each other. The end surface of the case includes an energy directing element formed as a continuous ridge with the outer portion of the cover having a plurality of energy directing elements disposed in transverse relation to the continuous ridge. The conductors include a nicked wire with a nick configured to break when sufficient internal pressure develops to move the movable region of the cover outwardly a predetermined distance and the nicked wire is connected to the end of the capacitor element closest the cover.

The invention provides a simple and low cost approach for ultrasonically sealing polymer encased capacitors having PSI capability, and one that can be performed quickly (e.g., in roughly one second or less) on a production line. A leak-tight seal, between a polymer capacitor case with a skirt and a polymer skirt-less cover, is provided with a bond strength sufficient to make the cover rupture-proof, i.e., enough strength to prevent the cover from separating from the case when subjected to internal pressure levels capable of activating the PSI system of the capacitor. A further benefit of using a skirt-less cover is that it allows less stringent radial tolerances of the case and cover dimensions which are typical of large molded polymer parts such as the case and cover, and provides the same improved welding across a wide range of case and cover diameters. Providing a flange or skirt at the open end of the capacitor case facilitates alignment of the cover to the case and conceals the flash of plastic produced at the interface of the case and cover during the ultrasonic welding process. Ultrasonically welding a cover with a skirt onto a skirt-less case may (because pressure is applied to the cover during welding) produce a discernible irregular flash of plastic around the rim.

Other features and advantages of the invention will be apparent from the following description of the preferred embodiment and from the claims.

DESCRIPTION OF THE PREFERRED EMBODIMENT

Figure 1:
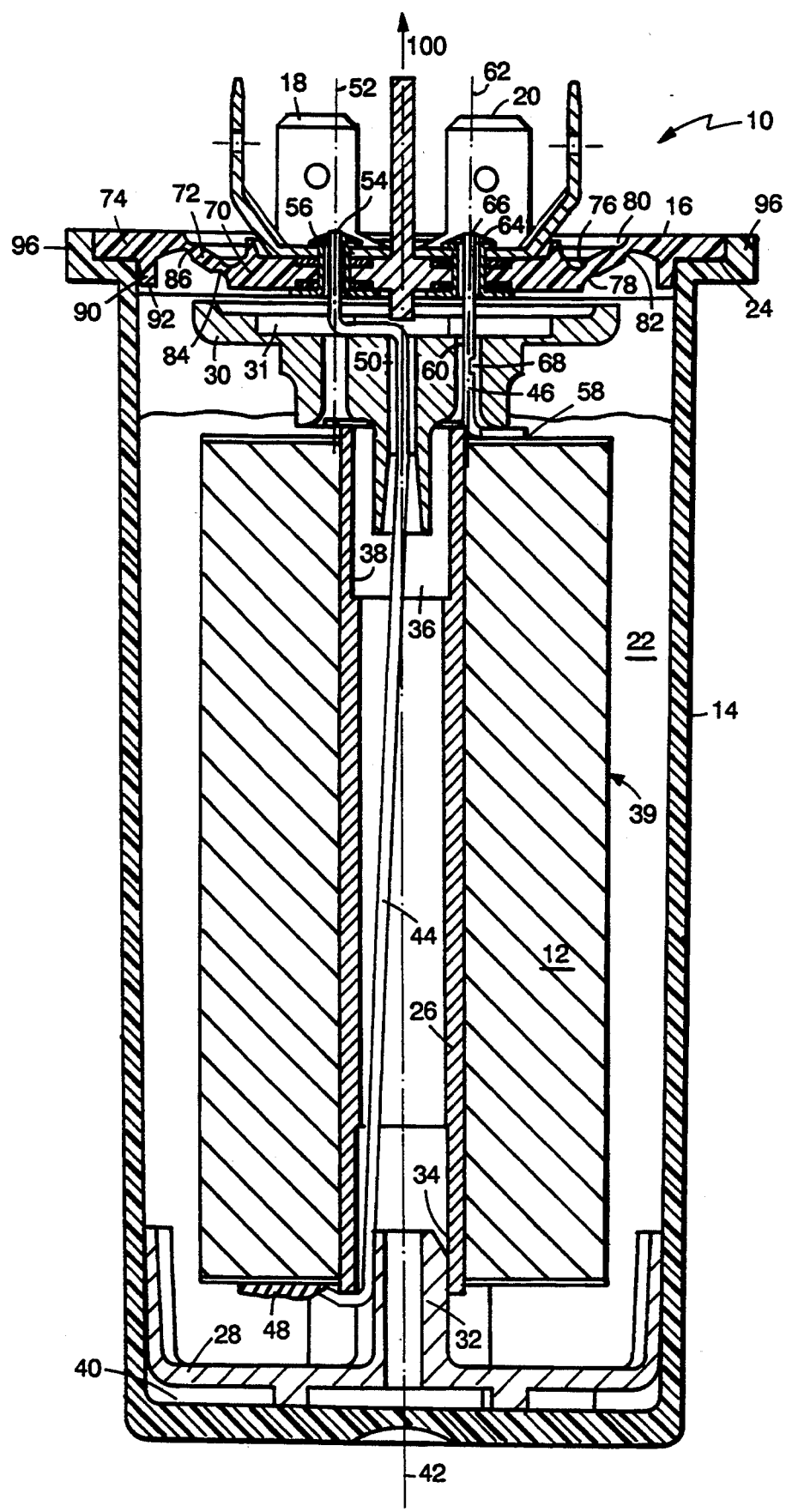
FIG. 1 is a longitudinal cross-sectional view of a preferred embodiment of the invention.

Referring to FIG. 1, a polymer encased capacitor 10 employing nicked wire circuit interruption capability and simplified automated manufacturing assembly includes a cylindrical capacitor core 12 inside a cylindrical polymer case 14 covered by a polymer cover 16 in which two electrical terminals 18 and 20 are mounted. The polymer case 14 and cover 16 are injection molded nylon, polypropylene, or another equivalent thermoplastic or thermoset resin. The interior of the case 14 is filled with an insulating oil compound 22, and the case is sealed by ultrasonically welding cover 16 to the case 14 at their mutual annular interface 24.

The capacitor core 12 is a typical metallic coated polymer wound about a central polymer spool 26. Capacitor core 12 is mounted in case 14 by means of a polymer bottom cup 28 and a polymer top retainer disk 30. A central retention member 32 is press-fit into a longitudinal counter-bore 34 in the bottom section of capacitor spool 26. Similarly, a top retainer disk retention member 36 is press-fit into a longitudinal counter-bore 38 in the top section of capacitor spool 26. Ports 31 in the top retainer disk 30 allow a pressure equalization path between the capacitor element and the cover. The combination including capacitor core 12, bottom cup 28 and top retainer disk 30 make up a capacitor core assembly 39. Bottom cup 28 supports capacitor core 12 against the bottom 40 of case 14 and contacts the sides of case 14 around its periphery to centrally position the capacitor core 12 coaxial with the central longitudinal axis 42 of the capacitor.

Electrical contacts 18 and 20 are electrically connected to the capacitor core 12 by a long wire 44 and a short wire 46 respectively. Long wire 44 is electrically connected to the bottom of the capacitor core by means of a solder joint 48, and is routed longitudinally through the core spool 26 to pass through a central aperture 50 in the top retention disk 30. Long wire 44 is then offset from the central longitudinal axis 42 and aligned with electrical connector axis 52 and passed through solder lug 54 where it is secured by means of a solder joint 56.

Short wire 46 is electrically connected to the top of capacitor core 12 by means of a solder joint 58, and is routed through aperture 60 in the top retention disk 30, along electrical connector 20 axis 62 to solder lug 64, where it is electrically secured by a solder joint 66. Enough tension is applied to short wire 46 before soldering to take residual slack out of the wire. Additionally, short wire 46 includes a carefully machined nick 68 which controls the amount of tension required to sever the wire 46.

Cover 16 includes a central disk portion 70, a concentric ring portion 72, and a concentric outer rim portion 74. An exterior annular groove 76 and an interior annular groove 78, together, define the interface between the central disk portion 70 and the annular ring portion 72. Similarly, an exterior annular groove 80 and an interior annular groove 82, together, define the interface between the annular ring 72 and the annular outer rim portion 74. Each of the annular groove pairs 76, 78 and 80, 82, are vertically aligned and define a flexible annular hinge region 84 and 86, respectively. When the internal pressure in the capacitor or external pulling force on central disk 70 rises sufficiently, hinge regions 84 and 86 bend to allow the central disk region 70 to axially move away from case 14 in direction 100. The degree of outward movement is dependent on the stiffness of the hinge regions, 84 and 86, and the magnitude of the applied force along direction 100.

Figure 2:
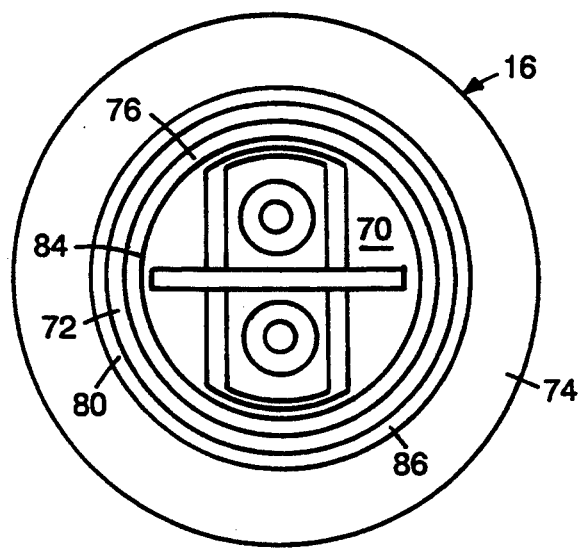
FIG. 2 is a top view of the capacitor cover of FIG. 1.
Figure 3:
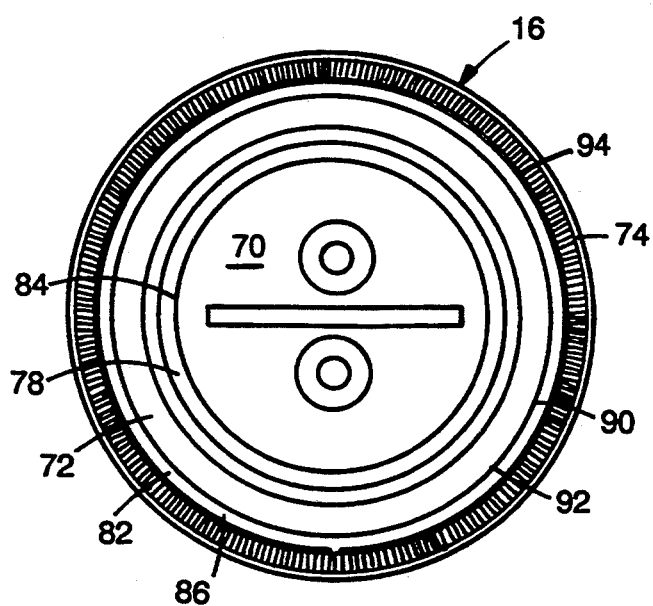
FIG. 3 is a bottom view of the capacitor cover of FIG. 1.

Referring to FIGS. 2 and 3, outer rim portion 74 defines an outer peripheral region including an inner annular flange 90 and a contact surface 92 extending from flange 90 to the outer edge of case 14. Contact surface 92 includes a plurality of radially extending ridges 94, each ridge having a triangular cross section with an apex of the triangle in contact with the opposing surface of case 14. Ridges 94 serve as "energy directors" which, as will be explained below, improve the ultrasonic welding process.

Referring again to FIG. 1, case 14 includes, at a top open portion, an upwardly-extending, annular flange 96 for aligning cover 16 to case 14, and for covering weld area 110 (FIG. 7) from view. Flange 96 has an inner diameter substantially that of the outer diameter of cover 16 which, in conjunction with the inner diameter of the capacitor walls, defines a top surface 98 for supporting the outer rim portion 74 of cover 16. It should be noted that aside from facilitating the alignment of cover 16 within case 14, flange 90 is generally not necessary for providing a leak-tight seal between cover 16 to case 14. Flange 96 also serves as a support surface 108 for mounting the polymer encased capacitor 10 within an assembly.

Figure 5:
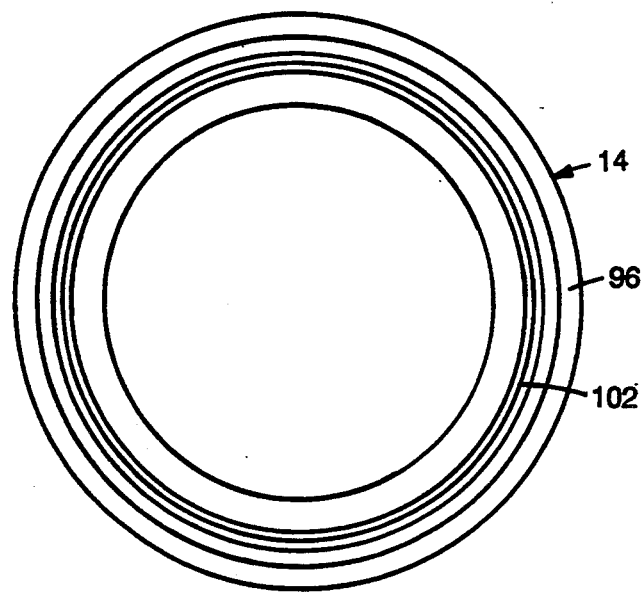
FIG. 5 is a top view of the capacitor case of FIG. 1.
Figure 4:
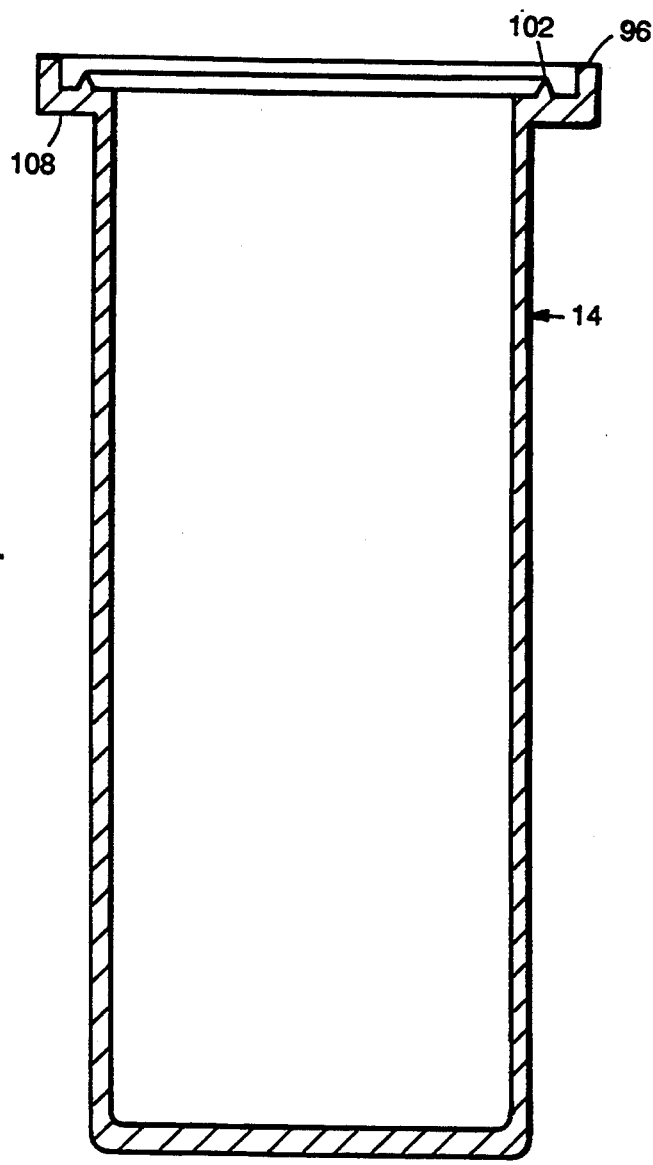
FIG. 4 is a longitudinal cross-sectional view of the capacitor case of FIG. 1.

Referring to FIGS. 4-5, case 14 includes a continuous annular ridge 102, projecting from top surface 104 of flange 96, which, like ridges 94, serves as an energy director during the ultrasonic welding of cover 16 to case 14. Ridge 104 also has a triangular cross section with an apex of the triangle in contact with and transverse to opposing surface apexes of ridges 94.

Figure 6:
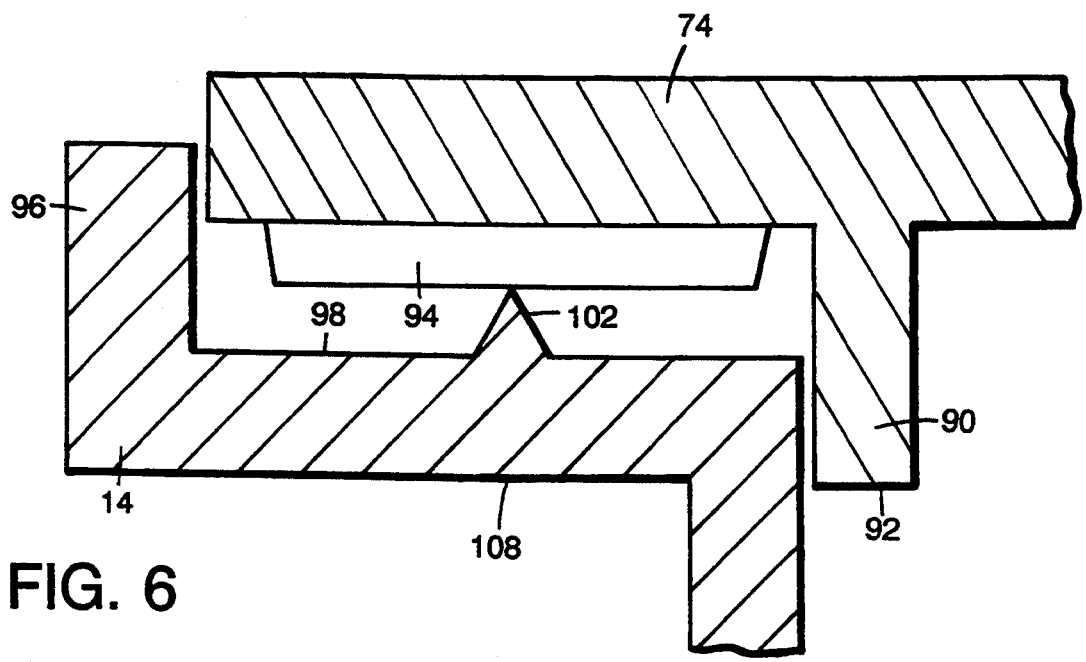
FIG. 6 is an enlarged view of the contact surface area between the capacitor case and cover before ultrasonic welding.
Figure 7:
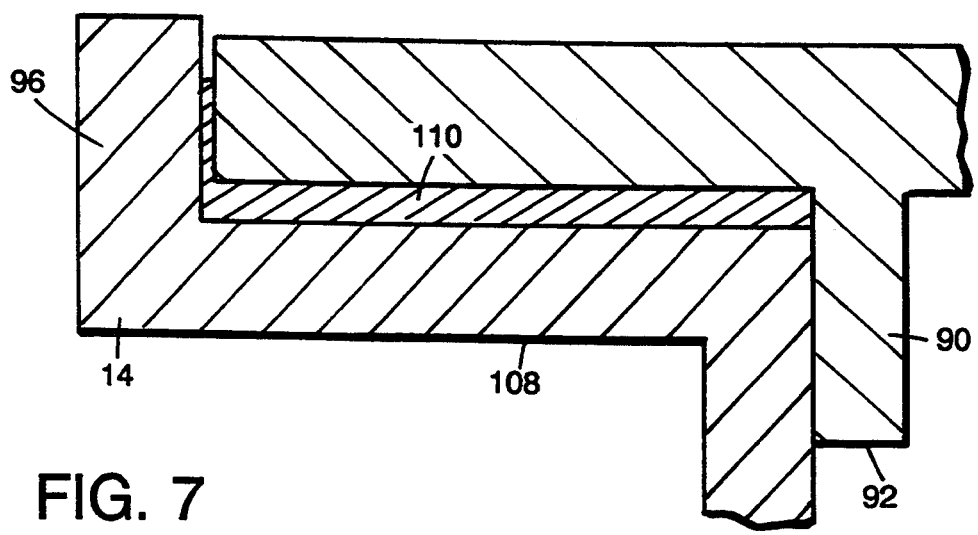
FIG. 7 is an enlarged view of the contact surface area between the capacitor case and cover after ultrasonic welding.

FIGS. 6 and 7 show enlarged views of the contact area between top surface 104 of case 14 and outer rim portion 74 of cover 16 before and after ultrasonic welding, respectively. The use of energy directors enhances the precision with which the cover and case surfaces are molded during ultrasonic welding by focusing the ultrasonic energy directly to the contact points so that heating and softening of the directors occurs from the apex to the base to incrementally fill in the gap between the surfaces. As shown in FIG. 7, the liquified plastic, upon cooling, hardens to form a flash 110 of plastic between the cover and case. Annular flange 96 contains and conceals any overflow of flash 110 which may be forced up and between the flange and cover when pressure is applied to the cover during welding. The enhanced precision in molding these surfaces in turn increases the uniformity and bond strength of the joint providing a leak-tight seal which can withstand the internal pressure within case 14 at levels capable of activating the pressure sensitive interrupter system.

During the ultrasonic welding operation, case 14 and cover 16 are vibrated with ultrasonic pulses by the ultrasonic resonator. The vibration modes of the cover are such that the problems attendant prior art covers with skirts are avoided. Specifically, vibration nodes (at which little or no welding occurs) are avoided. A possible explanation for this improvement is that the cover has less mass. Or it may be partially because by removing the skirt there is a lower bending moment of inertia for the "beam" extending around the periphery of the cover.

Many and various other embodiments are within the following claims. For example, an insubstantial downwardly extending portion could be provided at the periphery of the cover so long as the primary weld-covering skirt is on the case. And annular ridge 102 of case 14 may be formed to have a shape other than circular, such as a serpentine pattern or may be segmented rather than continuous. Further, the relative positions of ridges 94 on cover 16 and annular ridge 102 of case 14 may be reversed, so that the ridges 94 are on case 14 and the annular ridge 102 is on cover 16. Insulating materials other than oil may be used, e.g., epoxy and asphalt wax blends.

What is claimed is:

1. A leak-tight and rupture-proof polymer encased electrical capacitor having a pressure sensitive interruption system, the capacitor comprising:

a polymer case having an open end portion with an end surface;

a polymer cover having an outer portion ultrasonically sealed to said end surface of said polymer case at a sealed region, thereby providing a rupture-proof enclosure, the outer portion of the cover having a substantially uniform thickness from the sealed region to radially extending regions thereto, said polymer cover having a movable region that moves outwardly in a longitudinal direction in response to an overpressure condition within said polymer case, and a capacitor element disposed in said case, said capacitor element immersed in a dielectric material, an electrical connector mounted on said movable region of said polymer cover and connected to said capacitor element by an associated electrical conductor, said associated electrical conductor being configured to break when said movable region moves outwardly in said overpressure condition, and an outer flange extending upwardly from an outer edge of said open end of said case, said flange being shaped and sized to provide alignment of said outer portion of said cover prior to ultrasonic sealing.

2. The electrical capacitor of claim 1 wherein said outer flange contains and conceals a polymer flash produced during ultrasonic sealing.

3. The electrical capacitor of claim 1 wherein at least one of said end surface of said case and said outer portion of said cover further comprises a projecting energy directing element in contact with the other of said at least one of said end surface of said case and said outer portion of said cover.

4. The electrical capacitor of claim 3 wherein said end surface of the case and said outer portion of said cover each comprise energy directing elements in face-to-face contact with each other.

5. The electrical capacitor of claim 4 wherein said energy directing elements have substantially triangular cross sections, the apexes of said cross sections in contact with each other.

6. The electrical capacitor of claim 5 wherein one of said end surface of the case and said outer portion of said cover includes an energy directing element formed as a continuous ridge.

7. The electrical capacitor of claim 6 wherein the other of said end surface of the case and said outer portion of said cover includes a plurality of energy directing elements disposed in transverse relation to said continuous ridge.

8. The electrical capacitor of claim 1 wherein said conductors include a nicked wire with a nick configured to break when sufficient internal pressure develops to move said movable region of said cover outwardly a predetermined distance.

9. The electrical capacitor of claim 8 wherein said nicked wire is connected to an end of said capacitor element closest said cover.

10. The electrical capacitor of claim 1 wherein said polymer cover and said polymer case comprise thermoplastic.

11. A method of providing a leak-tight and rupture-proof seal between a polymer cover having an outer portion and a polymer case having an open end portion with an end surface, the polymer case encasing an electrical capacitor element and a pressure sensitive interruption system and the polymer cover, said method comprising the steps of:

installing said electrical capacitor element within an opening in said polymer case, said case having an open end, installing said outer portion of the polymer cover over said end surface of said polymer case, and ultrasonically welding said polymer cover to said case at a sealed region, while applying a longitudinal force to said cover, thereby providing a rupture-proof enclosure, the outer portion of the cover having a substantially uniform thickness from a sealed region to radially extending regions thereto and substantially preventing the generation of modes of vibration in which there are vibration nodes around the periphery of the cover, and wherein said polymer case comprises an outer flange extending upwardly from an outer edge of said open end of said case, said flange being shaped and sized to provide alignment of said outer portion of said cover prior to ultrasonic sealing.

12. The method of claim 11 wherein said outer flange contains and conceals a polymer flash produced during ultrasonic sealing.

13. The method of claim 11 wherein at least one of said end surface of said case and said outer portion of said cover further comprises a projecting energy directing element in contact with the other of said at least one of said end surface of said case and said outer portion of said cover.

14. The method of claim 13 wherein said end surface of the case and said outer portion of said cover each comprise energy directing elements in face-to-face contact with each other.

15. The method of claim 14 wherein said energy directing elements have substantially triangular cross sections, the apexes of said cross sections in contact with each other.

16. The method of claim 15 wherein one of said end surface of the case and said outer portion of said cover includes an energy directing element formed as a continuous ridge.

17. The method of claim 18 wherein the other of said end surface of the case and said outer portion of said cover includes a plurality of energy directing elements disposed in transverse relation to said continuous ridge.

18. The method of claim 11 wherein said polymer cover and said polymer case comprise thermoplastic.

* * * * *

UNITED STATES PATENT AND TRADEMARK OFFICE
CERTIFICATE OF CORRECTION

PATENT NO.   : 5,381,301

DATED        : January 10, 1995

INVENTOR(S)  : Martin Hudis

It is certified that error appears in the above-identified patent and that said Letters Patent is hereby corrected as shown below:

```
Column 8, line 24, "claim 18" should be --claim 16--.
```

Signed and Sealed this

Eighteenth Day of April, 1995

Attest:

BRUCE LEHMAN

Attesting Officer

Commissioner of Patents and Trademarks